US009122790B2

(12) United States Patent
Takahashi (10) Patent No.: US 9,122,790 B2
(45) Date of Patent: Sep. 1, 2015

(54) WEIGHTED CODE COVERAGE TOOL

(75) Inventor: James M. Takahashi, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/618,571

(22) Filed: Sep. 14, 2012

(65) Prior Publication Data

US 2013/0014090 A1      Jan. 10, 2013

Related U.S. Application Data

(63) Continuation of application No. 12/354,518, filed on Jan. 15, 2009, now Pat. No. 8,291,384.

(51) Int. Cl.
*G06F 9/44* (2006.01)
*G06F 11/36* (2006.01)

(52) U.S. Cl.
CPC ........ *G06F 11/3616* (2013.01); *G06F 11/3676* (2013.01)

(58) Field of Classification Search
None
See application file for complete search history.

(56) References Cited

U.S. PATENT DOCUMENTS

| 6,367,041 B1 | 4/2002 | Statovici et al. |
| 6,895,577 B1 | 5/2005 | Noble et al. |
| 7,861,226 B1 * | 12/2010 | Episkopos et al. ............ 717/124 |
| 2005/0081106 A1 | 4/2005 | Chang et al. |
| 2006/0026464 A1 | 2/2006 | Atkin et al. |

* cited by examiner

*Primary Examiner* — Don Wong
*Assistant Examiner* — Deric Ortiz
(74) *Attorney, Agent, or Firm* — Lieberman & Brandsdorfer, LLC (57) ABSTRACT

Evaluating software test comprehensiveness of an application. A subset of the software-under-test basic blocks is identified for emphasized and/or deemphasized testing. During test, execution of the basic blocks is monitored, and then aggregated into a weighted code coverage result which factors in the prioritization assignments of the subset of basic blocks.

18 Claims, 6 Drawing Sheets

| Basic Block | Base | UPA | Proximity | Per-node WCC |
|---|---|---|---|---|
| 1 | 100 | 0 | 25 | 125 |
| 2 | 100 | 0 | 0 | 100 |
| 3 | 100 | 0 | 50 | 150 |
| 4 | 100 | 100 | 0 | 200 |
| 5 | 100 | 0 | 50 | 150 |
| 6 | 100 | -100 | 0 | 0 |
| | | | Maximum WCC | 625 |
| | | | WCC Test Result | 575 |

100# WEIGHTED CODE COVERAGE TOOL

CROSS REFERENCE TO RELATED APPLICATION(S)

This application is a continuation patent application claiming the benefit of the filing date of U.S. patent application Ser. No. 12/354,518 filed on Jan. 15, 2009, and titled "Weighted Code Coverage Tool" now pending, which is hereby incorporated by reference.

BACKGROUND OF THE INVENTION

1. Technical Field

This invention relates to source code evaluation and software testing. More specifically, the invention relates to concentrating software testing for errors to a user-identified subset of the source code in order to maximize efficient use of test resources.

2. Description of the Prior Art

Source code is a sequence of program instructions in human-readable input format. More specifically, source code is primarily used as input to a process that produces an executable program. A branch is a point in a computer program, also known as set of program instructions, where the flow of control is altered. An instruction that causes a branch can be taken or not taken. If a branch is not taken, then the flow of control is unchanged, and the next instruction to be executed is the instruction immediately following the current instruction. However, if the branch is taken, the next instruction to be executed is an instruction at some other place in the code. There are two primary forms of branch instruction: a conditional branch and an unconditional branch. A conditional branch can either be taken or not taken depending on the condition, whereas an unconditional branch is always taken. One tool commonly employed in static analysis is known as a Control Flow Graph (CFG). Various execution paths may be represented in the CFG whose nodes represent basic blocks of sequentially-executing code, and whose connections (edges) between those nodes represent the branches that control the flow of program execution.

Figure 1:
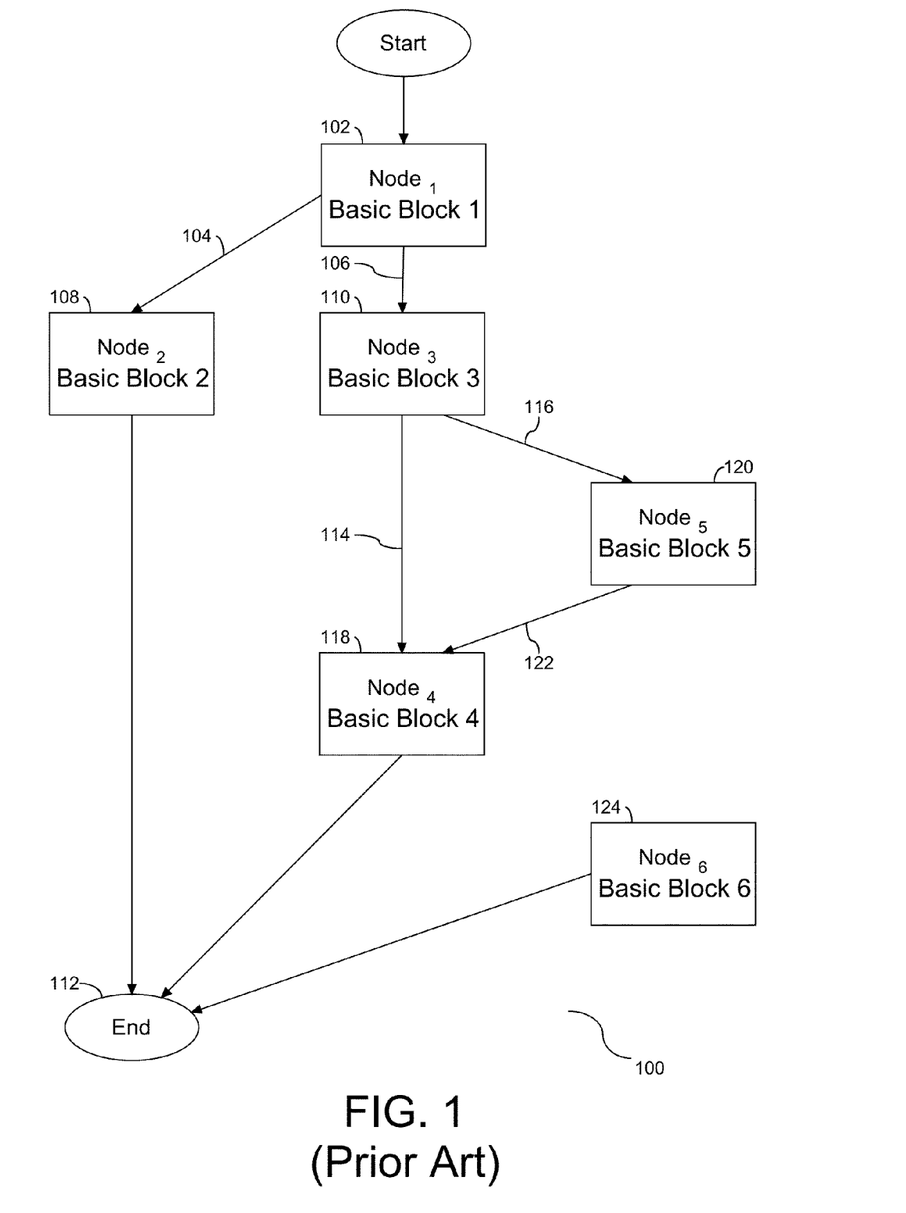
FIG. 1 is a prior art control flow diagram illustrating a hypothetical program to be tested.

FIG. 1 is a block diagram (100) of a sample prior art CFG wherein each node in the graph represents a basic block, and edges are used to represent jumps in the control flow. More specifically, an entry point, "Start" indicates that $node_1$, (102) will be the initial basic block to be executed. $Node_1$ ends in a conditional branch which leads to one of two optional exit branches (104) and (106), also known as edges. The first edge (104) directs the flow to a second basic block shown as $node_2$ (108), and the second edge (106) directs the flow to a third basic block shown as $node_3$ (110). Based upon the edge selected, the execution paths diverge. More specifically, based upon this example, choosing the first edge (104) leads to the second basic block (108) which unconditionally leads to an exit point (112) from the CFG. Conversely, choosing the second edge (106) leads to the third basic block (110) which has two optional exit branches (114) and (116). The third edge (114) directs the flow to the fourth basic block shown as $node_4$ (118), and the fourth edge (116) directs the flow to the fifth basic block shown as $node_5$ (120). Each of the fourth and fifth basic blocks (118) and (120) are shown as having a single (i.e., unconditional) exit branch. More specifically, the fourth basic block (118) leads to the exit point from the code path (112), and the fifth basic block (120) has an exit branch (122) that leads to the fourth basic block (118). Aside from the basic blocks discussed above, the example herein contains a sixth basic block shown as $node_6$ (124) that unconditionally leads to the exit point (112). As shown, there is no entry point from code execution for the sixth basic block, $node_6$, (124). In other words, the code represented by the sixth basic block is not reachable.

A software bug is an error in some form in a computer program that prevents the program from behaving as intended. In other words, the bug causes the program to produce an unintended or incorrect result. Most bugs arise from oversights made by computer programmers during design, coding, and data entry. Occasionally, bugs are introduced via other sources such as compilers producing incorrect code. Bugs can have a wide variety of effects, with varying levels of inconvenience to the user of the program. Some bugs have only a subtle effect on the program's functionality, and may lie undetected for a long time, while other bugs may cause more serious program errors such as crashes or data corruption.

Software testing is the process of checking a computer program to verify that it behaves as intended. In other words, software testing attempts to verify that the computer program is free from bugs. Code coverage is a commonly used metric for evaluating the comprehensiveness of software testing. It measures how much of the program-under-test has been executed during the test process. In CFG terms, code coverage measures a percentage of nodes executed during the software test cycle.

It is known in the art that achieving full path code coverage in software testing requires an exhaustive checking of all branch conditions for all conditional branches. Achieving full path code coverage is extremely difficult, if not impossible for complex program. Exhaustively testing each conditional branch to ensure execution of all basic blocks is expensive and time consuming. At some point, there is a diminishing return on the cost of testing for bugs in basic blocks that are not frequently utilized, or which are deemed less critical for other reasons. For this reason, software test plans generally have code coverage objectives that fall short of full path coverage. For example, a project's personnel and schedule constraints might lead to an 80% code coverage goal for the project's software test cycle. A significant problem with this approach, however, is that there is generally no distinction made for which 20% of the code will go untested.

Therefore, in view of the foregoing, it would be advantageous to provide a method, system, and program for improving efficient use of finite software test resources by focusing testing on the subset of code deemed to be most important. In the aforementioned example, the test team might attempt to focus their testing on the code where the presence of undiscovered bugs is deemed most likely to cause serious consequences.

SUMMARY OF THE INVENTION

This invention comprises a method, system and article for maximizing software test efficiency.

In one aspect of the invention, a method is provided for selected code for evaluation. A code execution path for the selected code is represented as a control flow graph. Each node in the graph represents a code block. A priority adjustment value is assigned to the block in the control flow graph. The value is based on a position of the code block within the graph. The value is based upon a de-emphasis of the code block or an emphasis of the code block. A weighted code coverage score is calculated for the code block based upon the priority adjustment value and a proximity value, which is defined by the proximity of the code block to a second code block in the graph. The second code block has a non-zero priority value. A weighted code coverage goal is defined for testing the selected code based on an aggregated weighted code coverage score for the code blocks. Execution for the code blocks is measured during text execution, and the weighted code coverage scores of the executed code blocks are aggregated. The defined weighted code coverage goal is met when the aggregated scores of the executed block meets or exceeds the defined code coverage goal.

In another aspect of the invention, a computer system is provided with a processor in communication with memory to select code for evaluation. A manager and an evaluator are provided in communication with the processor. The manager functions to represent a code execution path of the selected code as a control flow graph, with each node in the glow graph representing a code block. The manager assigns a priority adjustment value to the block in the control flow graph, with the priority adjustment value based on a position of the code block within the control flow graph. The priority adjustment value either emphasizes or de-emphasizes the code block. The manager further calculates a weighted code coverage score for the code block, with the score based on the priority adjustment value and a proximity value that is defined by the proximity of the code block to a second code block in the graph. The second code block has a non-zero priority value. The manager defines a weighted code coverage goal for testing the selected code based on an aggregated weighted code coverage score for the code blocks. The evaluator, which is in communication with the manager, measures execution for the code blocks during test execution and aggregates the weighted code coverage scores of the executed code blocks. The defined weighted code coverage goal is met when the aggregated scores of the executed blocks at least meets the defined code coverage goal.

In yet another aspect of the invention, an article is provided with a computer readable data storage medium including computer program instructions configured to select source code for error evaluation. Instructions are provided to select code for evaluation, including representing a code execution path for the selected code as a control flow graph with each node in the flow graph representing a code block. Instructions are provided to assign a priority adjustment value to the block in the control flow graph. The value is based on a position of the code block within the control flow graph, with the value to emphasize or de-emphasize the code block. Instructions are also provided to calculate a weighted code coverage score for the code block based upon the priority adjustment value and a proximity value defined by proximity of the code block to a second code block in the graph. The second code block has a non-zero priority value. In addition, instructions are provided to define a weighted code coverage goal for testing the selected code based on an aggregated weighted code coverage score for the code blocks, and to measure execution for the code blocks. The goal is met when the aggregated scores of the executed blocks meet the defined weighted code coverage goal.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as managers and tools. Both the manager(s) and tool(s) may be implemented in programmable hardware devices such as field programmable gate arrays, programmable array logic, programmable logic devices, or the like. Manager(s) and tool(s) may also be implemented in software for execution by various types of processors. An identified manager or tool of executable code may, for instance, comprise one or more physical or logical blocks of computer instructions which may, for instance, be organized as an object, procedure, function, or other construct. Nevertheless, the executables of an identified manager or tool need not be physically located together, but may comprise disparate instructions stored in different locations which, when joined logically together, comprise the manager(s) or tool(s) and achieve the stated purpose of the manager(s) or tool(s).

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus, and article of manufacture of the present invention provides valuable advantage over the prior art. The following example illustrates how the application of weighted code coverage values focuses testing on the subset of basic blocks that are most important.

Technical Details

In the following description of the embodiments, reference is made to the accompanying drawings that form a part hereof, and which is shown by way of illustration the specific embodiment in which the invention may be practiced. It is to be understood that other embodiments may be utilized because structural changes may be made without departing from the scope of the present invention.

In computing, a basic block is a sequence of code instructions that has one point of entry, one point of exit, and no branch instructions, i.e. conditional branching, therein. The start of a basic block may be jumped to from more than one location. It is recognized in the art that basic blocks and any associated conditional branches should be evaluated for errors to determine execution correctness. However, as source code becomes more complex, the cost of comprehensively evaluating all basic blocks and conditional branches increases. In one embodiment, it may be considered that an increase in the size of the source code is proportional to the associated burden of evaluating the code. It would therefore be beneficial to selectively focus code evaluation efforts on a subset of the code which is deemed to be most important. For example, not all basic blocks and conditional branches are employed in every execution of an associated application. In other words, there might be some basic blocks and conditional branches that are infrequently or never executed. Such infrequently executed blocks and branches may be omitted from a source code evaluation effort based upon economies of scale. Conversely, it may be desirable to determine which basic blocks and branches of source code are frequently executed to determine blocks and branches that are economically advisable to evaluate for error detection.

Figure 2:
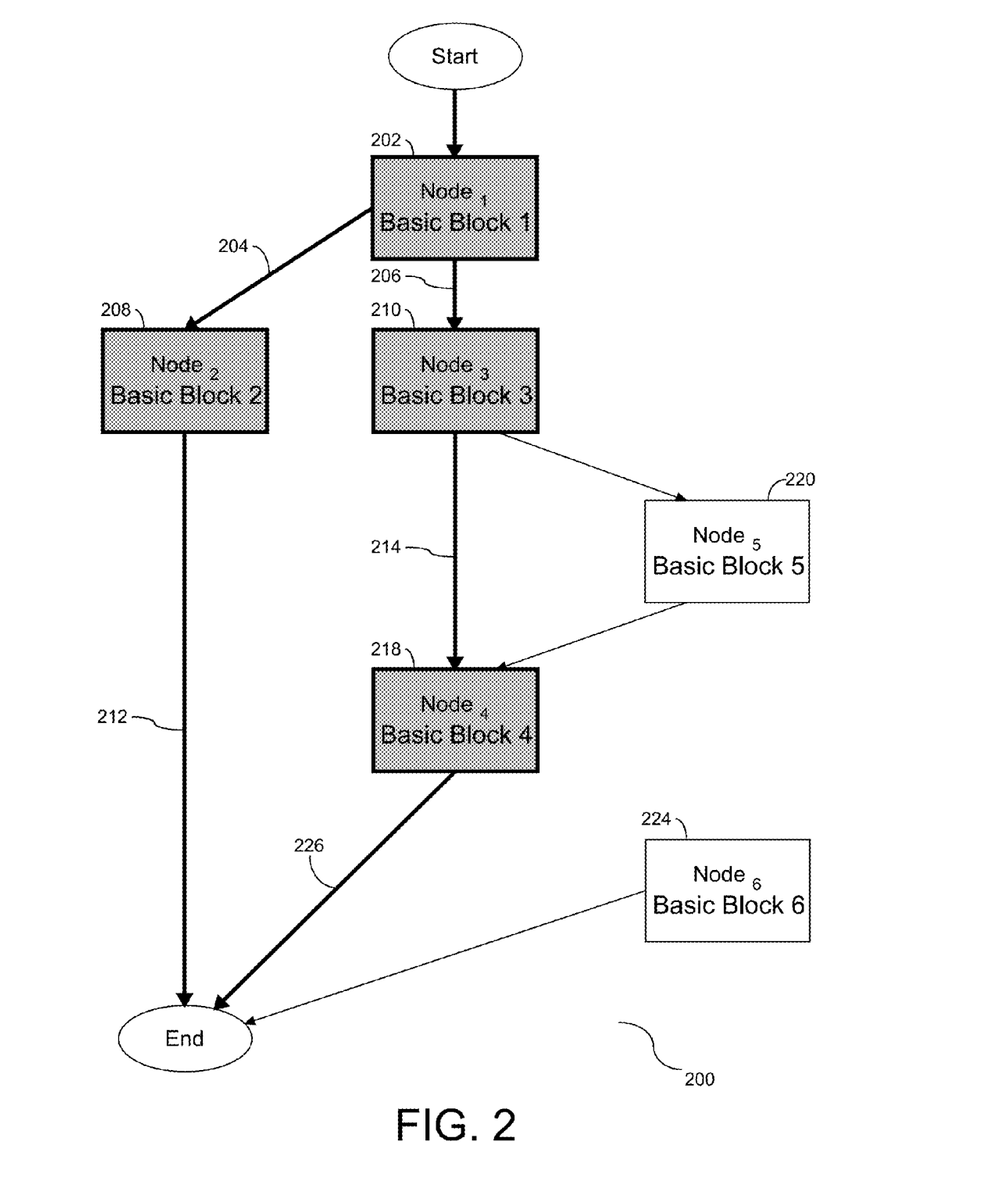
FIG. 2 is a control flow diagram illustrating selection of basic blocks for a code coverage tool according to the preferred embodiment of this invention, and is suggested for printing on the first page of the issued patent.

FIG. 2 is another version (200) of the control flow graph of FIG. 1, following execution of a hypothetical test plan of the code. As described below and reflected in the figures, the first basic block (202), the second basic block (208), the third basic block (210), the fourth basic block (218), and their associated edges (204), (206), (212), (214), and (226), respectively, are shown as having been executed during the testing. The fifth and sixth basic blocks (220) and (224), respectively, are shown as not having been executed during the testing. Accordingly, in this example test run, only two thirds of the basic blocks and their associated edges were executed. In prior art code coverage terms, this would constitute 67% code coverage.

Figure 3:
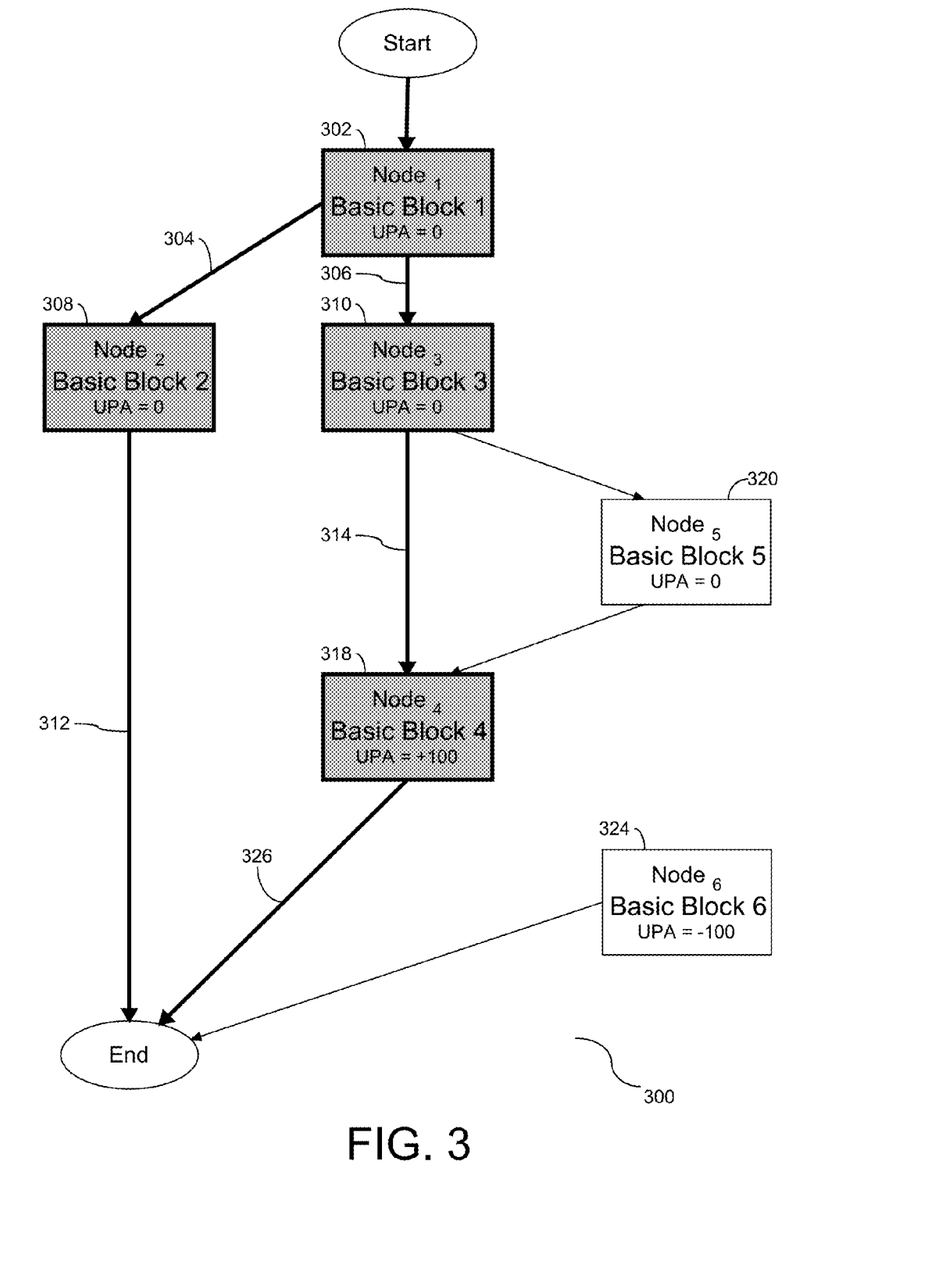
FIG. 3 is a control flow graph illustrating employment of a user prioritization adjustment value.

FIG. 3 is a control flow graph (300) representing the testing from FIG. 2, with application of a user-prioritization adjustment (UPA) value. In this case, node$_4$ (318) has been assigned a UPA value of +100, which indicates that the user has emphasized testing of that basic block. Conversely, node$_6$ (324) has been assigned a UPA value of −100, which indicates that the user has deemphasized testing of that basic block. The UPA values employed in this example are merely illustrative quantities. In one embodiment, alternative quantities may be employed for the UPA values. The remaining nodes (302), (308), (310, and (320) have UPA values of zero, which indicates that these nodes have neither a specified emphasis nor de-emphasis.

Figure 4:
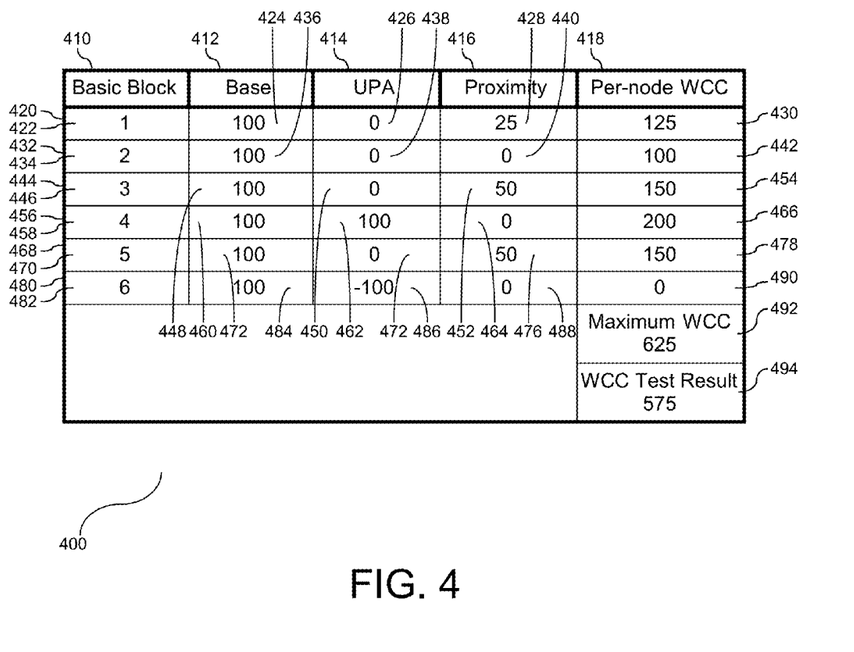
FIG. 4 is a table illustrating the method for calculating weighted code coverage values.

FIG. 4 is a table (400) illustrating an example of calculating the weighted code coverage result for the testing represented in FIG. 3. As shown, there are a plurality of columns (410), (412), (414), (416), and (418). Column (410) represents the basic blocks identified in the source code. In one embodiment, each basic block may be referred to as a node. Column (412) represents an initial weighted code coverage value, also known as a base value, or base. In the embodiment shown herein, each basic block has an initial base value of 100. Column (414) represents a user-assigned prioritization value, also known as UPA. Each identified basic block identified is assigned a UPA based upon a user determined importance of the subject block. Column (416) represents a proximity adjustment value which is a data value that is based upon the proximity of one basic block to other basic blocks with a non-zero UPA value. The proximity values (PROX) are calculated according to the following formula:

$$PROX = \text{Sum}(UPA_1)2^{\wedge}B_1 + K^*\text{Sum}(UPA_2)2^{\wedge}B_2 + K^*\text{Sum}(UPA_n)/2^{\wedge}B_n$$

where $B_n$ represents the conditional branch distance for a basic block from a neighboring basic block with a non-zero UPA value. For example $B_1$ represents one conditional branch away from a basic block whose UPA value is $UPA_1$, so its value is 1. $B_2$ represents two conditional branches away from an executed basic block whose UPA value is $UPA_2$, so its value is 2. The term $\text{Sum}(UPA_n)$ represents the aggregation of all UPA values of neighboring nodes that are n branches away. For example, $\text{Sum}(UPA_2)$ is the sum of all UPA values of all nodes in the CFG that are two branches distant from the node being evaluated. The variable K is a constant whose function is to balance the relative contributions of base, UPA, and PROX values, but is generally equal to 1.

The rationale for the PROX adjustment is that adjacency to code targeted for emphasized testing is also inherently more important since execution of the emphasized code becomes more likely as we execute nearby code. In the formula provided above, the power of two scaling is employed based upon principles of probability. If a basic block is adjacent to an emphasized basic block, i.e., within one conditional branch, then on average, it has a fifty percent change of leading to the emphasized basic block. Similarly, if a basic block is two conditional branches distant from an emphasized block, then on average, it has only a twenty-five percent chance of leading to the emphasized basic block, etc. It is readily apparent that the proximity effect rapidly drops off as branch distance increases. Conversely, being adjacent to many emphasized blocks increases the probability of leading to an emphasized block, which is why UPA values are aggregated on a per-branch-distance basis.

Finally, column (418) represents the per-node weighted code coverage (WCC) value. The data represented in column (418) is calculated based upon the cumulative value of the base amount, the UPA amount, and the proximity amount for each subject basic block. Each of the data values for columns (410)-(418) contribute to the determination of which basic blocks should be emphasized for code coverage. In one embodiment, testing of nodes, i.e. basic blocks, with high WCC values is emphasized, whereas testing of nodes with low WCC values is deemphasized.

Based upon the example of FIGS. 2 and 3, an example basic block assessment is calculated. More specifically, FIG. 4 with example data based upon the CFG of FIGS. 2 and 3. The first row of data (420) represents the first basic block (422), which has a base value of (424) of 100, a UPA (426) of zero, a proximity value (428) of 25, and cumulative weighted code coverage (430) of (125). The second row of data (432) represents the second basic block (434), which has a base value of (436) of 100, a UPA (438) of zero, a proximity value (440) of zero, and cumulative weighted code coverage (442) of (100). The third row of data (444) represents the third basic block (446), which has a base value of (448) of 100, a UPA (450) of zero, a proximity value (452) of fifty, and cumulative weighted code coverage (454) of (150). The fourth row of data (456) represents the fourth basic block (458), which has a base value of (460) of 100, a UPA (462) of one hundred, a proximity value (464) of zero, and cumulative weighted code coverage (466) of 200. The fifth row of data (468) represents the fifth basic block (470), which has a base value of (472) of 100, a UPA (474) of zero, a proximity value (476) of fifty, and cumulative weighted code coverage (478) of 150. The sixth row of data (480) represents the sixth basic block (482), which has a base value of (484) of 100, a UPA (486) of negative 100, a proximity value (488) of zero, and a cumulative weighted code coverage (490) of zero.

The following discussion describes how the proximity values were derived. As shown in the chart of FIG. 4, the sixth basic block (482) does not have any neighboring basic blocks, and as such, the proximity value (488) is zero. Similarly, basic blocks (434) and (458) do not have any neighbors with non-zero user prioritization adjustment values, and as such, their proximity values are also zero (440), (464), respectively. However, basic blocks (446) and (470) are each one edge distant from the fourth basic block (458), which has a non-zero user prioritization adjustment value. Since each of the basic blocks (446) and (470) are within one edge of basic block (458), their proximity values are each half of the user prioritization adjustment value of basic block (458). Similarly, the first basic block (422) is a distance of two edges from basic block (458). Therefore, the proximity value (428) for the first basic block is one-fourth of that shown in (458).

Following the assignment of data to each of the identified basic block, the data is accumulated. More specifically, column (418) represents the weighted code coverage (WCC) for each identified basic block, which is the aggregation of the base value, the user prioritization value, and the proximity value for each basic block. In this example, the first basic block has a WCC of 125, the second basic block has a WCC of 100, the third basic block has a WCC of 150, the fourth basic block has a WCC of 200, the fifth basic block has a WCC of 150, and the sixth basic block has a WCC of zero. Each of the basic blocks WCC are added together to calculate the maximum WCC of the CFG. In this example, the maximum WCC is 625, as shown at (492). The maximum WCC represents the value that would be obtained if every basic block was executed during testing of the code. More specifically, the maximum WCC represents the equivalent to 100% full-code coverage via prior art code coverage methodology. Based upon the CFG shown in FIG. 3, the first four basic blocks were executed during testing. The WCC for the basic blocks executed during testing are added together. In this example, the WCC of the executed basic blocks (494) has a value of 575. The ratio of the WCC of the executed basic blocks to the maximum WCC is calculated, which in this example has a value of 92 percent. Note that this weighted code coverage result is significantly higher than the prior art calculation of 67 percent. This difference results from rewarding testing of emphasized basic blocks, while minimizing the penalty for failing to test deemphasized basic blocks.

The example shown and demonstrated herein is based upon a hypothetical weighting scheme. In one embodiment, the sixth basic block of the CFG of FIG. 3 may be further de-emphasized in the code coverage analysis because it is determined to be a disabled basic block. Similarly, in one embodiment, the fourth basic block of the CFG may be emphasized because of its position in the CFG. Regardless of the particular emphasis or de-emphasis of specific blocks, each basic block may be assigned a unique weight, known as a user prioritization adjustment value (UPA). In one embodiment, the UPA value is known as a skewed value as it is a user assigned value. Accordingly, each identified basic block is assigned a numerical value by a user, which is a contributing factor to determining a percentage of code to be covered in a testing environment.

Figure 5:
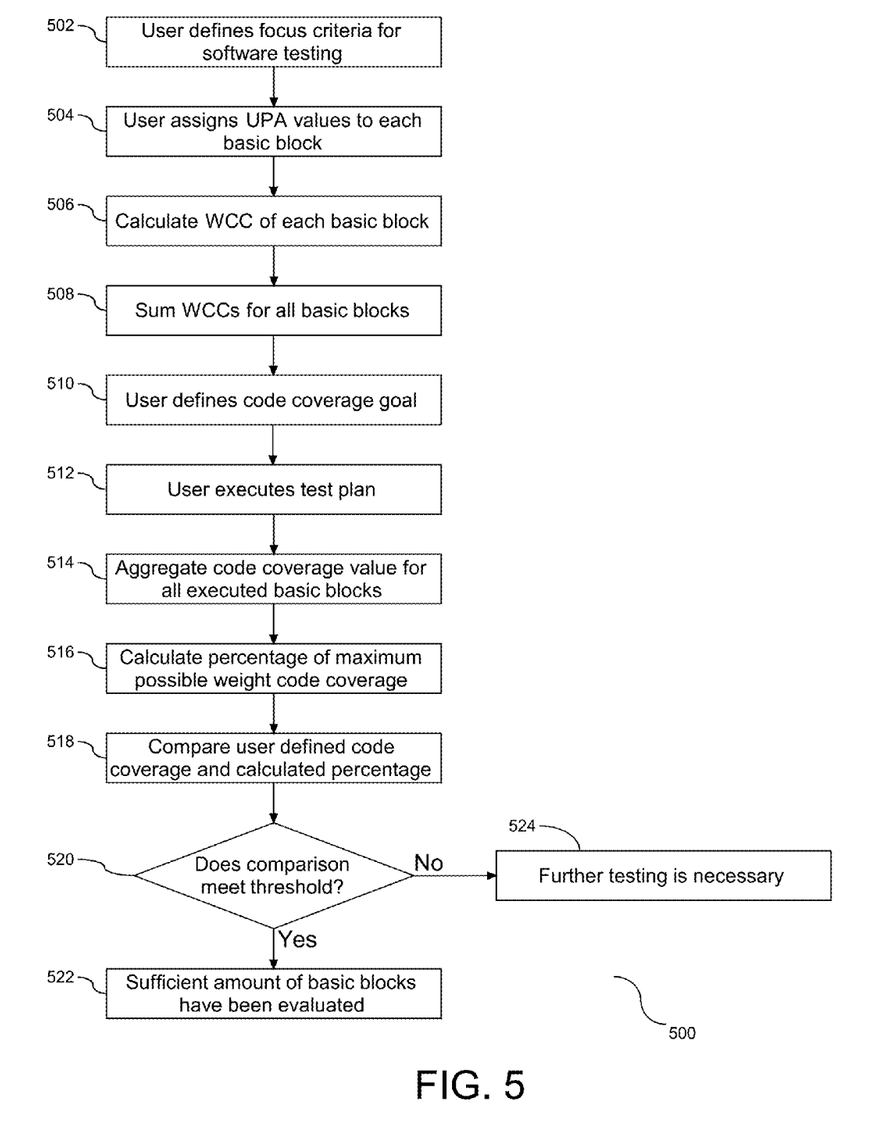
FIG. 5 is a flow chart illustrating the process for creating the weighted code coverage.

FIG. 5 is a flow chart (500) illustrating the process for creating the weighted code coverage as described above in FIG. 4. Initially, a user defines focus criteria for software testing (502). In one embodiment the focus criteria may include assigning a high priority to new code, assigning a low priority to disabled code, and/or assigning a high priority to section of code that historically are known to contain errors. As described above, each section of code, including new code, disabled code, etc. are categorized into basic blocks. The user assigns a user prioritization adjustment values (UPA) to each basic block (504). In one embodiment, the UPA assignment is based upon the criteria defined at step (502). Following the assignment at step (504), the weight code coverage value (WCC) of each basic block is calculated (506). As demonstrated in FIG. 4, the WCC of each basic block is the sum of the base, the user prioritization adjustment value, and the proximity value of the basic block. Once the WCC has been calculated for each basic block, all of the WCC's for all of the basic blocks are summed to determine the maximum possible WCC (508). Accordingly, the first part of the code evaluation includes the calculation of the WCC for each identified basic block, and the aggregation of all of the WCCs for all of the basic blocks.

Following step (508), the user defines their code coverage goal (510). For example, in one embodiment, the user may identify their goal that the code evaluation be limited to eighty percent of the maximum possible WCC. Following step (510), the user executes their test plan on a version of the code which has been instrumented to record executed versus non-executed basic blocks (512). The weighted code coverage value per basic block is aggregated for all executed basic blocks (514), and a percentage of maximum possible weight code coverage is calculated (516). A comparison (518) is made between the value defined at step (510) and the percentage value calculated at step (516). In one embodiment, a detailed report identifying all executed and non-executed basic block, and the WCC value for each basic block is generated. It is then determined if the comparison meets a threshold (520). If the comparison meets the threshold, then it is understood that a sufficient amount of basic blocks have been evaluated (522). Conversely, if the comparison does not meet the threshold, then further testing and evaluation of the software and the associated basic blocks is necessary (524).

As shown herein, the parsing of basic blocks based upon user-defined prioritization, probability and statistics functions as a solution for mitigating overhead associated with source code error evaluation. The processes shown in FIGS. 1-5 are methods for employing a statistical evaluation to appropriately focus the error evaluation on basic blocks that have have been deemed most important by the tester. In one embodiment, the statistical evaluation may be implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

Figure 6:
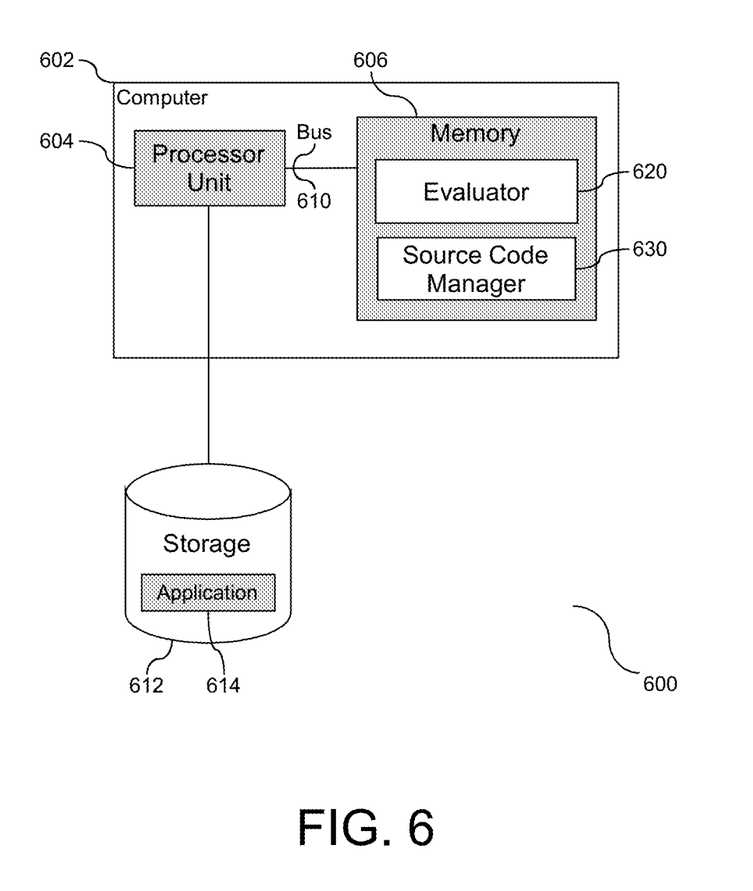
FIG. 6 is a block diagram illustrating placement of a source code error evaluation tools in a computer system.

FIG. 6 is a block diagram (600) illustrating placement of a source code error evaluation tools in a computer system. The illustration shows a computer system (602) with a processor unit (604) coupled to memory (606) by a bus structure (610). Although only one processor unit (604) is shown, in one embodiment the computer system (602) may include more processor units in an expanded design. The computer system (602) has a storage device (612) for persistent storage of data. In one embodiment, an application (614) and its associated source code may be stored on the storage device. Similarly, although only one storage device is shown, the system design may be expanded to include one or more additional storage devices.

The computer system (602) employs a source code manager (630). The source code manager (630) allows the user to assign prioritization values to a subset of the basic blocks. In addition, it identifies all conditional branches that enter the executed basic blocks assigned a value, and assigns a proximity value to each basic block The computer system employs an evaluator (620) which monitors the executed versus non-executed status of each basic block during testing. The evaluator (620) calculates and reports on the weighted code coverage values for all executed basic blocks as a percentage of the maximum possible weighted code coverage values for all basic blocks.

Although only one application (614) is shown herein, the invention should not be limited to evaluation of a single application. In one embodiment, multiple applications may be stored on the storage device and evaluated by the tools (620) and (630). Furthermore, the tools (620) and (630) are each shown residing in memory (606) of the computer system (602). However, the invention should not be limited to this embodiment. In one embodiment, each of the tools (620) and (630) may independently or concurrently reside as hardware tools external to memory (606) or implemented as a combination of hardware and software. Accordingly, the tools (620) and (630) may be implemented as a software tool or a hardware tool to facilitate error evaluation of source code with a probability of execution.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Unlike traditional code coverage techniques which treat the testing of all basic blocks equally, this invention encourages the testing of code sections with high WCC values, and does not penalize the tester for failing to test code sections with low WCC values. By using UPA values to emphasize some code sections while deemphasizing others, sufficient testing of the software under test may be accomplished with less effort than with traditional code coverage methods.

Alternative Embodiments

It will be appreciated that, although specific embodiments of the invention have been described herein for purposes of illustration, various modifications may be made without departing from the spirit and scope of the invention. In particular, there are many methods for identifying subsets of code for high priority testing. For example, in one embodiment a tool could be envisioned that sets high UPA values for code which has recently been added into an application, and low UPA values for code which has not been changed in a long time. Accordingly, the scope of protection of this invention is limited only by the following claims and their equivalents.

I claim:

1. A method comprising:
   selecting code for evaluation;
   representing a code execution path for the selected code as a control flow graph, each node in the flow graph representing a code block;
   assigning a user-prioritization adjustment value to the block in the control flow graph, the assigned value based upon a position of the code block within the control flow graph, and the assigned value selected from the group consisting of: de-emphasizing the code block and emphasizing the code block;
   calculating a weighted code coverage score for the code block based upon the assigned value and a proximity value defined by a proximity of the code block to a second code block in the flow graph, the second code block having a non-zero assigned value;
   defining a weighted code coverage goal for testing the selected code based upon an aggregated weighted code coverage score for the code blocks;
   measuring execution for the code blocks during test execution, and aggregating the weighted code coverage scores of the executed code blocks, wherein the defined weighted code coverage goal is met when the aggregated scores of the executed blocks at least meets the defined code coverage goal.

2. The method of claim 1, wherein the code block is a sequence of code instructions consisting of one entry point and one exit point.

3. The system of claim 1, further comprising calculating the proximity value based upon a conditional branch distance for a select block from a neighboring block, wherein the neighboring block has the non-zero value.

4. The method of claim 1, wherein emphasizing a code block includes assigning a high priority adjustment value to a new code block.

5. The method of claim 1, wherein emphasizing a code block includes assigning a high priority adjustment value to a code block historically known to contain an error.

6. The method of claim 1, wherein de-emphasizing a code block includes assigning a low priority adjustment value to a disabled code block.

7. A computer system comprising:
a processor in communication with memory, the memory to select code for evaluation;
a manager in communication with the processor to represent a code execution path for the selected code as a control flow graph, each node in the flow graph representing a code block;
the manager to assign a user-prioritization adjustment value to the block in the control flow graph, the assigned value based upon a position of the code block within the control flow graph, and the assigned value selected from the group consisting of: de-emphasizing the code block and emphasizing the code block;
the manager to calculate a weighted code coverage score for the code block based upon the assigned value and a proximity value defined by a proximity of the code block to a second code block in the flow graph, the second code block having a non-zero assigned value;
the manager to define a weighted code coverage goal for testing the selected code based upon an aggregated weighted code coverage score for the code blocks; and
an evaluator in communication with the manager, the evaluator to:
measure execution for the code blocks during test execution, and aggregate the weighted code coverage scores of the executed code blocks, wherein the defined weighted code coverage goal is met when the aggregated scores of the executed blocks at least meet the defined code coverage goal.

8. The system of claim 7, wherein the code block is a sequence of code instructions consisting of one entry point and one exit point.

9. The system of claim 7, further comprising the manager to calculate the proximity value based upon a conditional branch distance for a select block from a neighboring block, wherein the neighboring block has the non-zero value.

10. The system of claim 7, wherein emphasis of a code block includes assignment of a high priority adjustment value to a new code block.

11. The system of claim 7, wherein emphasis of a code block includes assignment of a high priority adjustment value to a code block historically known to contain an error.

12. The system of claim 7, wherein de-emphasis of a code block includes assignment of a low priority adjustment value to a disabled code block.

13. An article comprising:
a computer readable data storage device including computer instructions configured to select code for error evaluation, the instructions comprising:
instructions to select code for evaluation;
instructions to represent a code execution path for the selected code as a control flow graph, each node in the flow graph representing a code block;
instructions to assign a user-prioritization adjustment value to the block in the control flow graph, the assigned value based upon a position of the code block within the control flow graph, and the assigned value selected from the group consisting of: de-emphasizing the code block and emphasizing the code block;
instructions to calculate a weighted code coverage score for the code block based upon the assigned value and a proximity value defined by a proximity of the code block to a second code block in the flow graph, the second code block having a non-zero assigned value;
instructions to define a weighted code coverage goal for testing the selected code based upon an aggregated weighted code coverage score for the code blocks; and
instructions to measure execution for the code blocks during test execution, and aggregate the weighted code coverage scores of the executed code blocks, wherein the defined weighted code coverage goal is met when the aggregated scores of the executed blocks at least meet the defined code coverage goal.

14. The article of claim 13, wherein the code block is a sequence of code instructions consisting of one entry point and one exit point.

15. The article of claim 13, further comprising instructions to calculate the proximity value based upon a conditional branch distance for a select block from a neighboring block, wherein the neighboring block has the non-zero value.

16. The article of claim 13, wherein emphasizing a code block includes assigning a high priority adjustment value to a new code block.

17. The article of claim 13, wherein emphasizing a code block includes assigning a high priority adjustment value to a code block historically known to contain an error.

18. The article of claim 13, wherein said de-emphasizing a code block includes assigning a low priority adjustment value to a disabled code block.

* * * * *